(12) United States Patent
Gensch

(10) Patent No.: US 11,498,783 B2
(45) Date of Patent: Nov. 15, 2022

(54) PALLETISING DEVICE AND METHOD FOR OPERATING A PALLETISING DEVICE

(71) Applicant: Koerber Supply Chain Automation Eisenberg GmbH, Eisenberg (DE)

(72) Inventor: Waldemar Gensch, Eisenberg (DE)

(73) Assignee: Koerber Supply Chain Automation Eisenberg GmbH, Eisenberg (DE)

( * ) Notice: Subject to any disclaimer, the term of this patent is extended or adjusted under 35 U.S.C. 154(b) by 0 days.

(21) Appl. No.: 17/269,576

(22) PCT Filed: Aug. 15, 2019

(86) PCT No.: PCT/EP2019/071942
§ 371 (c)(1),
(2) Date: Feb. 19, 2021

(87) PCT Pub. No.: WO2020/038826
PCT Pub. Date: Feb. 27, 2020

(65) Prior Publication Data
US 2021/0309467 A1   Oct. 7, 2021

(30) Foreign Application Priority Data

Aug. 21, 2018   (DE) ..................... 10 2018 214 050.2

(51) Int. Cl.
*B65G 57/24* (2006.01)
*B65G 57/06* (2006.01)
*B65G 61/00* (2006.01)

(52) U.S. Cl.
CPC ............. *B65G 57/24* (2013.01); *B65G 57/06* (2013.01); *B65G 61/00* (2013.01)

(58) Field of Classification Search
CPC ......... B65G 57/24; B65G 57/06; B65G 61/00
See application file for complete search history.

(56) References Cited

U.S. PATENT DOCUMENTS 3,986,620 A   10/1976  Wilde et al.
4,439,084 A    3/1984  Werkheiser
(Continued)

FOREIGN PATENT DOCUMENTS

DE   2636320    2/1977
DE  19943800    3/2001
(Continued)

OTHER PUBLICATIONS

MSK Verpackungs-Systeme GmbH, "MSK Palettierer für Kästen," https://www.youtube.com/watch?v=K3rZISUF29Q. Dec. 15, 2017.
(Continued)

*Primary Examiner* — Lynn E Schwenning
(74) *Attorney, Agent, or Firm* — Dority & Manning, P.A.

(57) ABSTRACT

The invention relates to a palletizing apparatus comprising a compressing apparatus which has a peripheral closed frame, wherein at least one slider that is movable in a horizontal direction is arranged on the frame, and a set-down device) which defines a transport face for transporting article layers. The frame surrounds a through-opening that passes through in a vertical direction (Z), and the set-down device is movable in a longitudinal direction (X) relative to the compressing apparatus between a first longitudinal position, in which the transport face is arranged in a manner offset in the longitudinal direction (X) with respect to the frame, and a second longitudinal position, in which a projection of the through-opening in the vertical direction (Z) lies on the transport face. The compressing apparatus and the set-down device are in this case arranged on a lifting apparatus so as to be movable in the vertical direction (Z). The invention also relates to a method for operating a palletizing apparatus according to the invention, which comprises a plurality of steps.

7 Claims, 3 Drawing Sheets

(56) References Cited

U.S. PATENT DOCUMENTS

| | | |
|---|---|---|
| 5,893,258 A | 4/1999 | Lancaster |
| 2001/0050213 A1 | 12/2001 | Koini et al. |
| 2013/0160403 A1 | 10/2013 | Herpell et al. |
| 2014/0294553 A1 | 10/2014 | Petrovic |
| 2015/0075948 A1 | 3/2015 | Beer et al. |
| 2015/0086319 A1 | 3/2015 | Martini |
| 2015/0151930 A1 | 6/2015 | Kollmuss et al. |

FOREIGN PATENT DOCUMENTS

| | | |
|---|---|---|
| DE | 20021874 | 7/2002 |
| DE | 202013103400 | 11/2014 |
| DE | 102013108231 | 2/2015 |
| DE | 102015200731 | 8/2016 |
| EP | 2653417 | 10/2013 |
| IT | MI20081787 | 4/2010 |
| JP | H05330658 | 12/1993 |
| NL | 8801528 | 1/1990 |
| WO | WO2005092753 | 10/2005 |

OTHER PUBLICATIONS

International Search Report for PCT/EP2019/071942 dated Nov. 5, 2019.

PALLETISING DEVICE AND METHOD FOR OPERATING A PALLETISING DEVICE

The invention relates to a palletizing apparatus comprising a compressing apparatus which has a peripheral closed frame, wherein at least one slider that is movable in a horizontal direction is arranged on the frame, and a set-down device which defines a transport face for transporting article layers. The invention also relates to a method for operating a corresponding palletizing apparatus, which comprises a compressing apparatus and a set-down device.

PRIOR ART

A palletizing apparatus is used to arrange articles, in particular piece goods, or containers for transport on pallets. To this end, the articles are, for example, initially combined into individual article layers and then set down in layers on a pallet, or on a layer stack already located on the pallet. Such a palletizing apparatus is known for example from the document EP 2 881 347 B1.

In order to be palletized, the articles normally pass initially through a feed apparatus, in which the articles, which initially arrive in one or more rows one after another, are rearranged and/or assembled into stackable article layers. The stackable article layers are then transferred successively to the palletizing apparatus, which sets down the article layers on a desired stacking location, in particular on a pallet.

To this end, the palletizing apparatus comprises for example a set-down table, in a further development a set-down belt, which comprises a circulating conveyor belt. The set-down device, for example a set-down table or conveyor belt, defines a transport face for transporting the articles, or the article layers. The set-down device of the palletizing apparatus is generally movable vertically on a lifting device. During palletization, in each case a stackable article layer is conveyed by the feed apparatus onto the transport face of the set-down device, and the set-down device is moved vertically to the height corresponding to the layer stack.

The document US 2014/0294553 A1 discloses a generic palletizing apparatus which comprises a conveyor belt and a compressing apparatus. During palletization, an article layer is conveyed by the conveyor belt onto a divisible bottom face of the compressing apparatus and compressed and fixed there by means of sliders. As a result of the divisible bottom face traveling away and the sliders moving away from the article layer, the article layer is set down on the layer stack. The bottommost article layer of a layer stack is in this case set down directly on the pallet.

The document US 2013/0160403 A1 also discloses a generic palletizing apparatus which comprises a conveyor belt and a compressing apparatus with a bottom face. During palletization, an article layer is conveyed by the set-down belt onto the bottom face of the compressing apparatus. The compressing apparatus has a stationary or movable stop for orienting the article layer on the bottom face.

The document DE 10 2013 108 231 A1 discloses a palletizing apparatus and a method for palletizing article layers. The palletizing apparatus comprises a centering device, which has four movable push bars. During palletization, an article layer is arranged between the push bars and the push bars are moved toward the article layer, with the result that the article layer is compressed and/or centered.

The document DE 100 18 385 A1 discloses a method and an apparatus for loading piece goods. The apparatus comprises a circulating conveyor belt, which is attached to a robot arm.

The documents EP 2 653 417 A1, DE 199 43 800 A1, DE 10 2015 200 731 A1 and DE 10 2013 218 442 A1 also disclose palletizing apparatuses and methods for palletizing article layers.

PROBLEM

The problem addressed by the present invention is that of improving a palletizing apparatus of the type mentioned at the beginning. In particular, the problem addressed by the invention is that of increasing the speed during palletization and ensuring that the article layers are set down precisely on a layer stack.

SOLUTION

This problem is solved by a palletizing apparatus having the features of claim 1. Advantageous configurations and developments of the invention are the subject matter of the dependent claims.

A generic palletizing apparatus comprises a compressing apparatus which has a peripheral closed frame, wherein at least one slider that is movable in a horizontal direction is arranged on the frame. The at least one slider is in this case movable at least in translation in said horizontal direction.

The generic palletizing apparatus furthermore comprises a set-down device which defines a transport face for transporting article layers. The transport face in this case extends at least approximately horizontally, i.e. the at least one slider is movable, in particular in translation, in a direction parallel to the transport face.

According to the invention, the frame surrounds a through-opening that passes through in a vertical direction. The vertical direction extends in this case at right angles to said horizontal direction. In the case of an operating palletizing apparatus, the vertical direction is generally at right angles to a floor. The frame of the compressing apparatus is thus open at the top and open at the bottom. The through-opening serves in particular to receive an article layer.

Furthermore, the set-down device is movable in a longitudinal direction relative to the compressing apparatus between a first longitudinal position, in which the transport face is arranged in a manner offset in the longitudinal direction with respect to the frame, and a second longitudinal position, in which a projection of the through-opening in the vertical direction lies on the transport face. The longitudinal direction extends in this case at right angles to the vertical direction and represents, inter alia, a horizontal direction. An article layer located on the set-down device can thus be moved to the compressing apparatus, in particular into the opening thereof, by a movement of the set-down device from the first longitudinal position into the second longitudinal position.

According to the invention, the compressing apparatus and the set-down device are in this case arranged on a lifting apparatus so as to be movable in the vertical direction. Thus, the compressing apparatus and the set-down device can be moved in the vertical direction to a surface of an already created layer stack.

A transverse direction extends at right angles to the vertical direction and at right angles to the longitudinal direction. The transverse direction, just like the longitudinal direction, represents a horizontal direction. The transport face of the set-down device extends at right angles to the vertical direction in a plane that is defined by the longitudinal direction and the transverse direction. A horizontal direction should be understood as meaning any direction that extends at right angles to the vertical direction and parallel to a plane defined by the longitudinal direction and the transverse direction.

The set-down device comprises for example a circulating conveyor belt. The circulating conveyor belt of the set-down device defines the transport face for transporting the article layer.

According to one advantageous configuration of the invention, the peripheral closed frame of the compressing apparatus has a rectangular cross section and comprises four frame parts. The frame parts surround said opening. This is advantageous in particular when the article layers to be palletized also have a substantially rectangular cross section. Depending on the configuration of the article layers to be palletized, the frame can also have some other cross section, for example triangular, semicircular or round.

Preferably, a slider is arranged on each of the frame parts. The sliders are in this case each arranged on a side of the frame parts that faces the opening.

According to one advantageous development of the invention, at least one slider is additionally movable in the vertical direction from a standby position into a working position. This makes it possible for an article layer to be moved in the horizontal direction into the opening of the compressing apparatus, while the slider is in the standby position. Subsequently, the slider is moved into the working position, where it is located at the height of the article layer in the vertical direction.

Preferably, the slider is in this case movable in translation in the vertical direction from the standby position into the working position.

Alternatively, the slider may be pivotable from the standby position into the working position about a pivot axis extending in the transverse direction. While it is being moved from the standby position into the working position, said slider then moves simultaneously in rotation in the vertical direction and in the longitudinal direction.

Preferably, the compressing apparatus and the set-down device are movable in the vertical direction relative to one another. Thus, the set-down device can be moved to a height for receiving a further article layer, while the compressing apparatus remains at the height of the surface of the layer stack that has already been created.

Particularly preferably, the set-down device and the compressing apparatus are movable in the vertical direction such that the set-down device is located above the compressing apparatus in the vertical direction, and such that the set-down device is located beneath the compressing apparatus in the vertical direction. When the set-down device is located in the first longitudinal position, the set-down device can be moved past the compressing apparatus in the vertical direction.

The problem is also solved by a method for operating a palletizing apparatus according to the invention having the features of claim 10. Advantageous configurations and developments of the invention are the subject matter of the dependent claims.

The method according to the invention for operating a palletizing apparatus according to the invention, which comprises a compressing apparatus which has a peripheral closed frame that surrounds a through-opening that passes through in a vertical direction, wherein at least one slider that is movable in a horizontal direction is arranged on the frame, and which comprises a set-down device that defines a transport face for transporting article layers, comprises the following steps:

First of all at least one article layer is conveyed onto the transport face of the set-down device while the set-down device is located in a first longitudinal position in which the transport face is arranged in a manner offset in a longitudinal direction with respect to the frame of the compressing apparatus.

Then, the set-down device is moved in the longitudinal direction relative to the compressing apparatus to a second longitudinal position in which a projection of the through-opening of the compressing apparatus in the vertical direction lies on the transport face.

Subsequently, the article layer is compressed by moving the at least one slider toward the article layer. The at least one slider is in this case moved in particular in translation. Simultaneously with the compression, the article layer is preferably also centered in the opening of the compressing apparatus while the article layer is located on the transport face of the set-down device.

Then, the set-down device is moved in the longitudinal direction relative to the compressing apparatus back to the first longitudinal position. As a result, the article layer is stripped off at one of the sliders and drops onto a surface of a pallet located under the compressing apparatus or onto a layer stack located on the pallet.

The set-down device comprises for example a circulating conveyor belt. The circulating conveyor belt of the set-down device defines the transport face for transporting the article layer.

While the set-down device is being moved in the longitudinal direction relative to the compressing apparatus back to the first longitudinal position, the article layer can also be conveyed by means of the conveyor belt, synchronously with the movement of the set-down device, but in the opposite direction, and thus set down in a manner that protects the product. In this case, the conveyor belt runs synchronously with the movement of the set-down device relative to the compressing apparatus such that the article layer is not moved, or moved only marginally, relative to the compressing apparatus. The set-down device is thus drawn away under the compressing apparatus, while the article layer remains at the compressing apparatus. The movement of the set-down device can in this case be synchronized with the movement of the conveyor belt such that the article layer does not come into contact with the sliders.

However, it is also conceivable to vary the speed of the conveyor belt slightly during the movement of the set-down device in the longitudinal direction relative to the compressing apparatus back to the first longitudinal position. In particular, at the beginning of the movement of the set-down device, the conveyor belt can run slightly more quickly, with the result that the article layer is pushed against a slider. At the end of the movement of the set-down device, the conveyor belt can run slightly more slowly, with the result that the article layer is pushed against an opposite slider. As a result, the article layer can be oriented to two sides, namely to the front and to the rear. This is useful in particular if the article layer has internal gaps.

According to one advantageous configuration of the invention, immediately before the compression of the article layer, at least one slider is moved from a standby position, in which the slider is located above the article layer in the vertical direction, into a working position, in which the slider is located at the height of the article layer in the vertical direction. In this case, the article layer is moved in the horizontal direction into the opening of the compressing apparatus, while the slider is in the standby position. When the article layer is located in the opening of the compressing apparatus, the slider is moved into the working position.

According to another advantageous configuration of the invention, immediately before the compression of the article layer, the compressing apparatus and the set-down device are moved in the vertical direction relative to one another such that the at least one slider is located at the height of the article layer in the vertical direction. Said movement of the compressing apparatus and of the set-down device in the vertical direction relative to one another takes place in this case while the set-down device is located in the second longitudinal position.

Preferably, before the set-down device is moved to the second longitudinal position, the compressing apparatus and the set-down device are moved in the vertical direction relative to one another such that the set-down device is located beneath the compressing apparatus in the vertical direction.

In order that the article layer to be palletized can be processed by the compressing apparatus, the opening of the compressing apparatus advantageously has a greater extent in the longitudinal direction and in a transverse direction than the article layer to be palletized.

FIGURES AND EMBODIMENTS OF THE INVENTION

The invention is explained in more detail in the following text on the basis of an advantageous exemplary embodiment illustrated in the figures. The invention is not limited to this exemplary embodiment, however. The figures illustrate the subject matter of the invention only schematically. In the figures.

Figure 1:
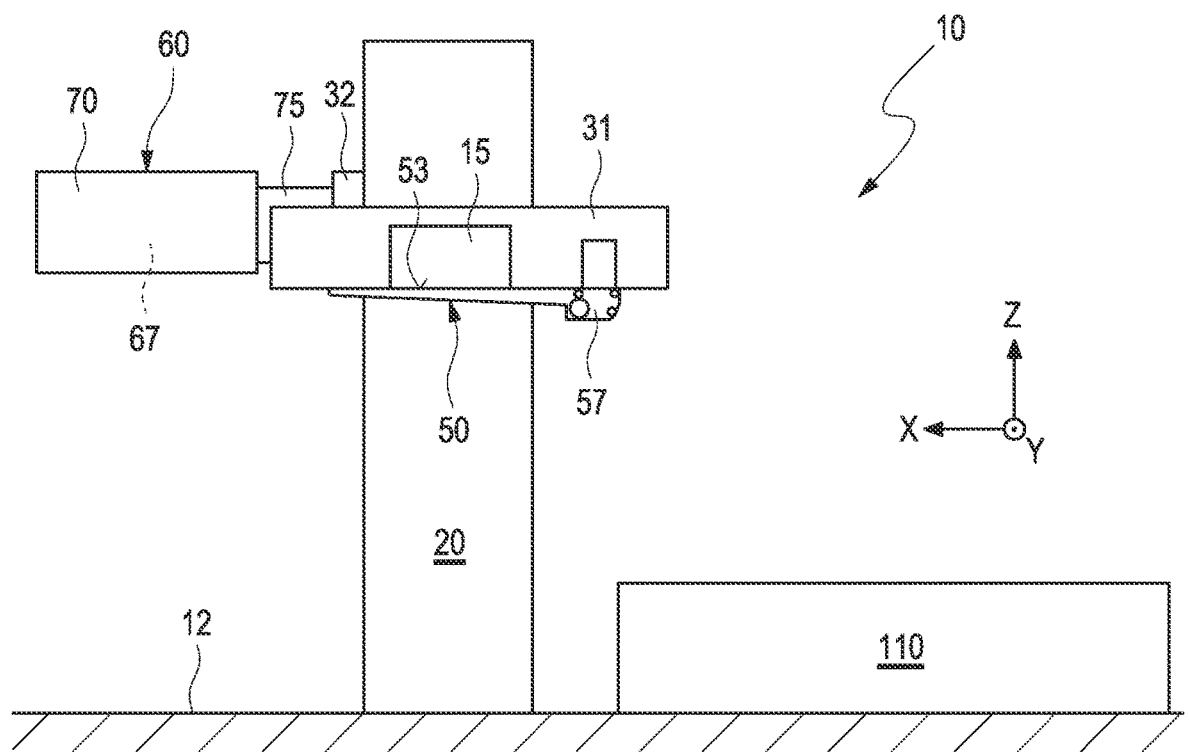
FIG. 1 shows a schematic front view of a palletizing apparatus.

FIG. 1 shows a schematic front view of a palletizing apparatus 10. The palletizing apparatus 10 stands on a floor 12 and serves to set down goods, in particular an article layer 15, on a pallet (not illustrated here). The article layer 15 is fed to the palletizing apparatus 10 by a feed apparatus 110. In this case, first of all individual goods are combined by the feed apparatus 110 into a stackable article layer 15, and the article layer 15 is subsequently transported further in a longitudinal direction X to the palletizing apparatus 10. The longitudinal direction X extends parallel to the floor 12.

The palletizing apparatus 10 comprises a lifting apparatus 20, which extends substantially in a vertical direction Z away from the floor 12. The vertical direction Z extends at right angles to the floor 12 and at right angles to the longitudinal direction X. A transverse direction Y extends at right angles to the vertical direction Z and at right angles to the longitudinal direction X.

Arranged in the present case on the lifting apparatus 20 is a first carriage 31, which is movable in the vertical direction Z. Fastened to the first carriage 31 is a set-down device 50. The set-down device 50 is thus movable in the vertical direction Z relative to the lifting apparatus 20. The set-down device 50 is additionally movable in the longitudinal direction X relative to the first carriage 31 and to the lifting apparatus 20.

The set-down device 50 defines a transport face 53 for transporting the article layer 15. To this end, the set-down device 50 comprises for example a circulating conveyor belt, concealed here, which defines the transport face 53. The transport face 53 extends in a plane that is defined by the longitudinal direction X and the transverse direction Y. The vertical direction Z thus extends at right angles to the transport face 53.

The set-down device 50 may in this case have two side walls 57, which extend predominantly in the longitudinal direction X and parallel to one another. The transport face 53 of the set-down device 50 is configured in this case in a rectangular, in particular approximately square, manner. The transport face 53 thus has for example an extent in the transverse direction Y that corresponds at least approximately to an extent in the longitudinal direction X.

Also arranged in the present case on the lifting apparatus 20 is a second carriage 32, which is movable in the vertical direction Z. Fastened to the second carriage 32 is a compressing apparatus 60. The compressing apparatus 60 is thus movable in the vertical direction Z relative to the lifting apparatus 20. The first carriage 31 and the second carriage 32 are movable in the vertical direction Z more or less independently of one another. Thus, the compressing apparatus 60 and the set-down device 50 are also movable in the vertical direction Z more or less independently of one another and relative to one another.

The compressing apparatus 60 has a peripheral closed frame 70. The compressing apparatus 60 furthermore has an arm 75 for connecting the frame 70 to the second carriage 32. The set-down device 50 is also movable in the longitudinal direction X relative to the compressing apparatus 60. Thus, the transport face 53 is also movable in the longitudinal direction X relative to the frame 70.

It is also conceivable for the second carriage 32 to be dispensed with and for the compressing apparatus 60 likewise to be fastened to the first carriage 31. In this case, the compressing apparatus 60 and the set-down device 50 are movable jointly in the vertical direction Z relative to the lifting apparatus 20. The compressing apparatus 60 and the set-down device 50 are in this case also movable in the longitudinal direction X relative to one another, but not movable in the vertical direction Z relative to one another.

In the illustration shown here, an article layer 15 is located on the transport face 53 of the set-down device 50. The set-down device 50 is located in a first longitudinal position. In the first longitudinal position, the transport face 53 of the set-down device 50 is arranged in a manner offset in the longitudinal direction X with respect to the frame 70 of the compressing apparatus 60.

Figure 2:
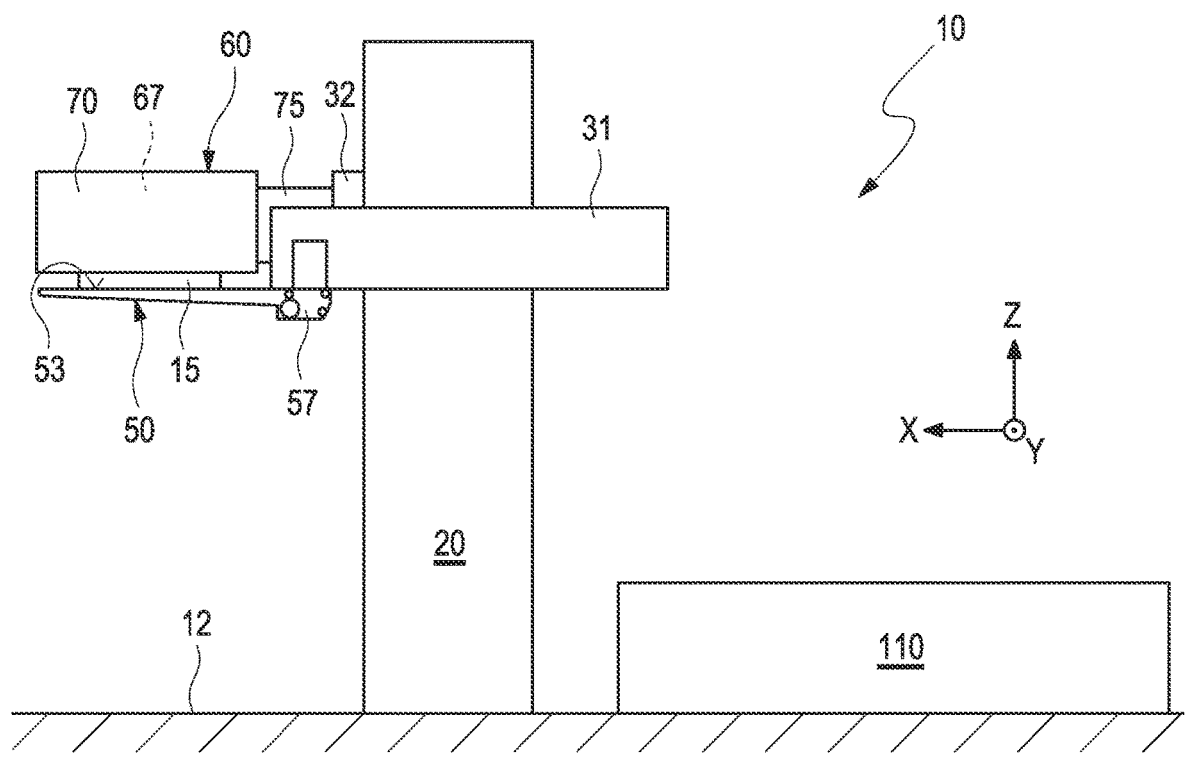
FIG. 2 shows a further schematic front view of the palletizing apparatus from FIG. 1.

FIG. 2 illustrates a further schematic front view of the palletizing apparatus 10 from FIG. 1. In contrast to the illustration in FIG. 1, in the illustration in FIG. 2, the set-down device 50 is located in a second longitudinal position. In the second longitudinal position, the transport face 53 of the set-down device 50 is arranged directly beneath the frame 70 of the compressing apparatus 60.

The frame 70 of the compressing apparatus 60 surrounds a through-opening 67, concealed here, that passes through in the vertical direction Z. In the second longitudinal position, a projection of the through-opening 67 in the vertical direction Z lies on the transport face 53 of the set-down device 50. In the illustration shown here, the article layer 15 located on the transport face 53 projects into the opening 67 of the compressing apparatus 60.

During palletization, the article layer 15 is set down on the pallet (not illustrated here) or on a layer stack located on said pallet. The pallet is in this case located beneath the compressing apparatus 60 in the vertical direction Z. A plurality of article layers 15 form the layer stack on the pallet. The compressing apparatus 60 can be moved downward in the vertical direction Z, wherein the layer stack projects through the opening 67. In the process, the frame 70 surrounds the layer stack.

Figure 3:
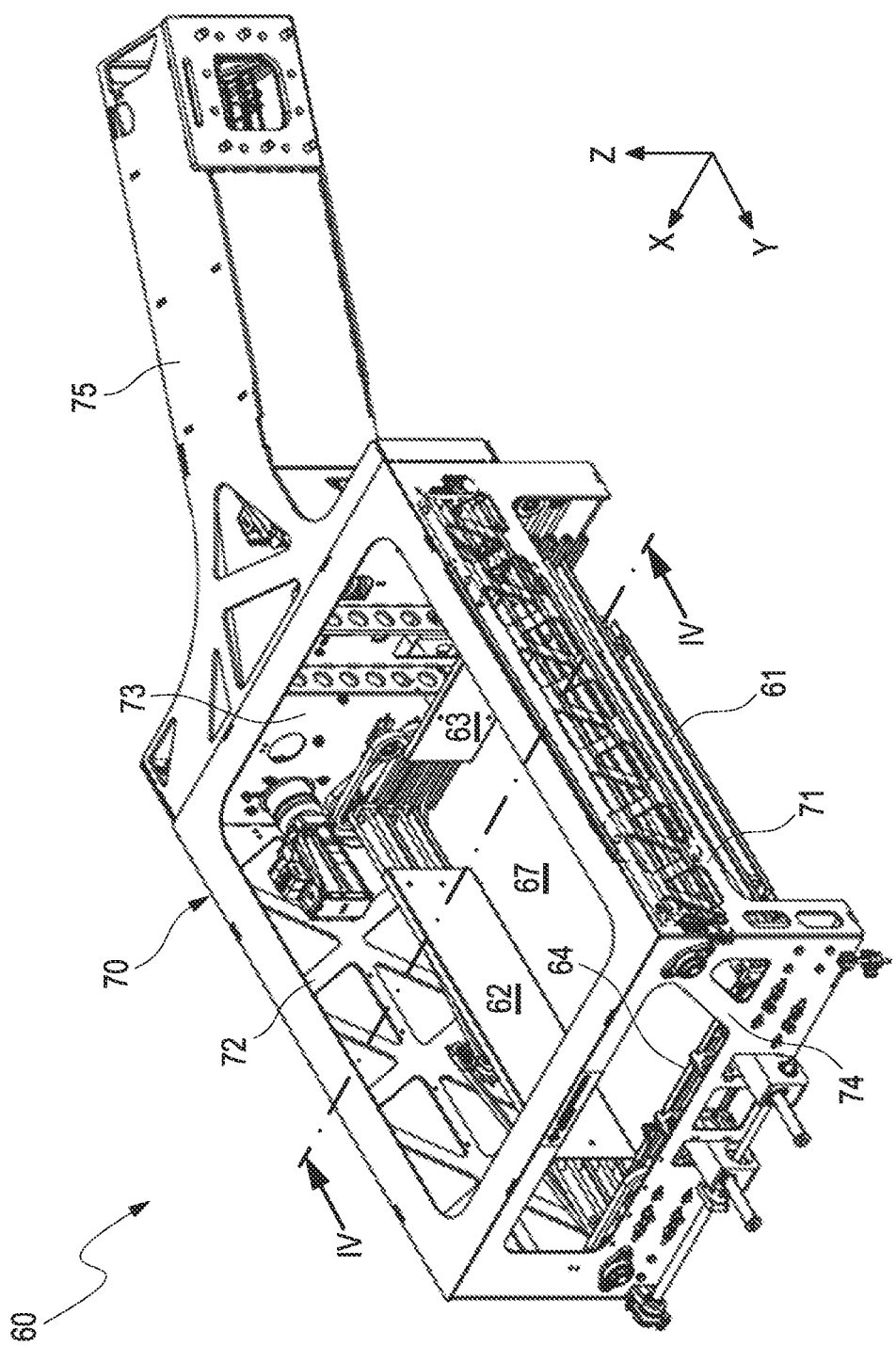
FIG. 3 shows a perspective illustration of a compressing apparatus.

FIG. 3 shows a perspective illustration of the compressing apparatus 60. The peripheral closed frame 70 of the compressing apparatus 60 has a rectangular cross section. The frame 70 comprises a first frame part 71 and a second frame part 72, which extend at right angles to the longitudinal direction X. The frame 70 also comprises a third frame part 73 and a fourth frame part 74, which extend at right angles to the transverse direction Y. The first frame part 71 and the second frame part 72 thus extend parallel to one another and at right angles to the third frame part 73 and the fourth frame part 74.

Said four frame parts 71, 72, 73, 74 surround the above-mentioned through-opening 67 that passes through in the vertical direction Z. An extent of the first frame part 71 in the vertical direction Z is in the present case less than the extent of the second frame part 72, of the third frame part 73 and of the fourth frame part 74 in the vertical direction Z. The arm 75 is fastened to the third frame part 73. In the present case, the arm 75 extends in an inclined manner with respect to the longitudinal direction X and in an inclined manner with respect to the transverse direction Y.

A first slider 61 is arranged on the first frame part 71. A second slider 62 is arranged on the second frame part 72. A third slider 63 is arranged on the third frame part 73. A fourth slider 64 is arranged on the fourth frame part 74. The sliders 61, 62, 63, 64 are arranged at the same height in the vertical direction Z in the illustration shown here.

The first slider 61 is movable in the longitudinal direction X relative to the first frame part 71. The second slider 62 is movable in the longitudinal direction X relative to the second frame part 72. The third slider 63 is movable in the transverse direction Y relative to the third frame part 73. The fourth slider 64 is movable in the transverse direction Y relative to the fourth frame part 74. The sliders 61, 62, 63, 64 are in this case movable in particular in translation in the longitudinal direction X or, respectively, in the transverse direction Y. The first slider 61 is additionally movable in the vertical direction Z relative to the first frame part 71.

When an article layer 15 (not shown here) is located in the opening 67 of the compressing apparatus 60, said article layer 15 is surrounded by the sliders 61, 62, 63, 64. If the sliders 61, 62, 63, 64 are now moved toward the article layer 15, the article layer 15 is compressed and centered in the opening 67 of the compressing apparatus 60 as soon as the sliders 61, 62, 63, 64 come into contact with the article layer 15.

If the sliders 61, 62, 63, 64 are now moved away from the article layer 15, the sliders 61, 62, 63, 64 are spaced apart from the article layer 15 again. The compressing apparatus 60 can now be moved downward in the vertical direction Z, wherein the layer stack projects through the opening 67. As a result, it is also possible for an article layer 15 located further down in the layer stack to be additionally recompressed.

Figure 4:
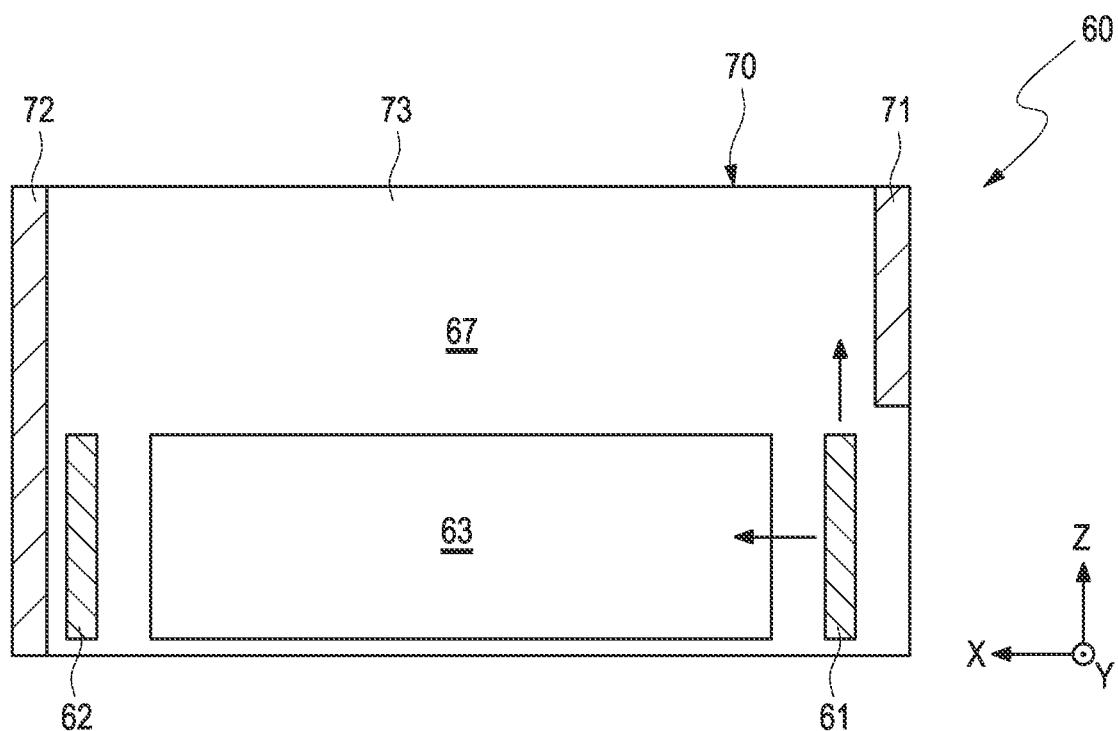
FIG. 4 shows a schematic sectional illustration of the compressing apparatus from FIG. 3.

FIG. 4 shows a schematic sectional illustration of the compressing apparatus 60 from FIG. 3. The chosen section plane extends in this case at right angles to the transverse direction Y and parallel to the longitudinal direction X and also parallel to the vertical direction Z.

In the illustration shown here, the first slider 61 is in a working position. In the working position, the first slider 61 is located at the same height in the vertical direction Z as the second slider 62, the third slider 63 and the fourth slider 64, which is not visible here. The first slider 61 is movable in translation in the vertical direction Z relative to the first frame part 71 into a standby position. Corresponding arrows indicate the direction of movement of the first slider 61, namely in translation in the vertical direction Z between the working position and the standby position, and in translation in the longitudinal direction X.

Figure 5:
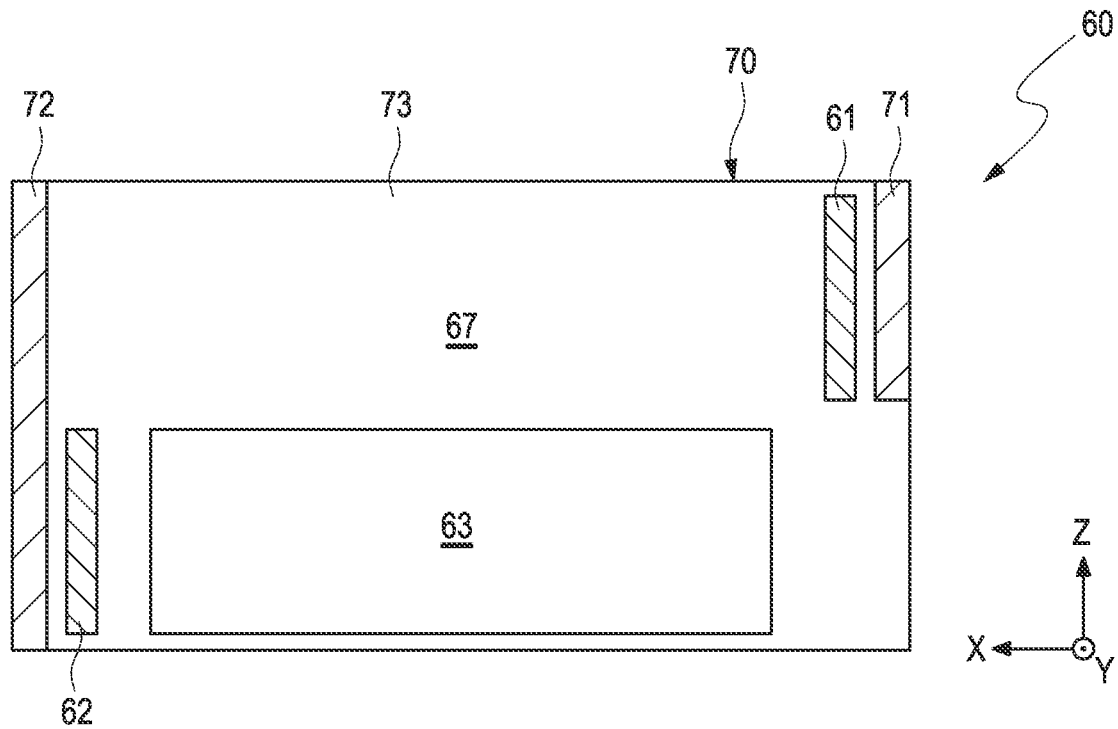
FIG. 5 shows a further schematic sectional illustration of the compressing apparatus from FIG. 3.

FIG. 5 shows a further schematic sectional illustration of the compressing apparatus 60 from FIG. 3. In the illustration shown here, the first slider 61 is in the standby position. In this case, compared with the working position shown in FIG. 4, the first slider 61 has been moved upward in translation relative to the first frame part 71 in the vertical direction Z.

It is also conceivable for the first slider 61 to be pivotable from the working position into a standby position about a pivot axis. In this case, the pivot axis extends preferably in the transverse direction Y. When it is moved from the standby position into the working position, the first slider 61 then moves simultaneously in rotation in the vertical direction Z and in the longitudinal direction X.

When the first slider 61 is located in the standby position, an article layer 15 (not shown here) can be moved through in the longitudinal direction X under the first slider 61 and under the first frame part 71 into the opening 67 of the compressing apparatus 60. Subsequently, the first slider 61 is moved into the working position. Then, the first slider 61 is also located at the height of the article layer 15 in the vertical direction Z.

The invention is not limited to the exemplary embodiments described here and the aspects highlighted therein. Rather, a large number of modifications that lie within the capabilities of a person skilled in the art are possible within the scope defined by the claims.

LIST OF REFERENCE SIGNS

10 Palletizing apparatus
12 Floor
15 Article layer
20 Lifting apparatus
31 First carriage
32 Second carriage
50 Set-down device
53 Transport face
57 Side wall
60 Compressing apparatus
61 First slider
62 Second slider
63 Third slider
64 Fourth slider
67 Opening
70 Frame
71 First frame part
72 Second frame part
73 Third frame part
74 Fourth frame part
75 Arm
110 Feed apparatus
X Longitudinal direction
Y Transverse direction
Z Vertical direction

The invention claimed is:

1. A palletizing apparatus comprising
a compressing apparatus which has a peripheral closed frame, wherein at least one slider that is movable in a horizontal direction is arranged on the frame, and a set-down device which defines a transport face for transporting article layers, characterized in that the frame surrounds a through-opening that passes through in a vertical direction (Z), in that the set-down device is movable in a longitudinal direction (X) relative to the compressing apparatus between a first longitudinal position, in which the transport face is arranged in a manner offset in the longitudinal direction (X) with respect to the frame, and a second longitudinal position, in which a projection of the through-opening in the vertical direction (Z) lies on the transport face, and in that the compressing apparatus and the set-down device are arranged on a lifting apparatus so as to be movable in the vertical direction (Z), the at least one slider is movable in translation in the horizontal direction, the slider being arranged on each of the frame parts and being movable in the vertical direction (Z) from a standby position into a working position and the set-down device and the compressing apparatus are movable such that the set-down device is located above the compressing apparatus in the vertical direction (Z) in a first vertical position, and such that the set-down device is located beneath the compressing apparatus in the vertical direction (Z) in a second vertical position.

2. The palletizing apparatus as claimed in claim 1, characterized in that the set-down device comprises a circulating conveyor belt which defines the transport face for transporting the article layer.

3. The palletizing apparatus as claimed in claim 1, characterized in that the peripheral closed frame has a rectangular cross section and comprises four frame parts.

4. A method for operating a palletizing apparatus as claimed in claim 1, comprising the following steps of:

conveying at least one article layer onto the transport face of the set-down device while the set-down device is located in a first longitudinal position in which the transport face is arranged in a manner offset in a longitudinal direction (X) with respect to the frame, moving the set-down device in the longitudinal direction (X) relative to the compressing apparatus to a second longitudinal position in which a projection of the through-opening in the vertical direction (Z) lies on the transport face, compressing the article layer by moving the at least one slider toward the article layer, moving the set-down device in the longitudinal direction (X) relative to the compressing apparatus to the first longitudinal position, the at least one slider is moved in translation toward the article layer during the compression of the article layer and immediately before the compression of the article layer, at least one slider is moved from a standby position, in which the slider is located above the article layer in the vertical direction (Z) into a working position, in which the slider is located at the height of the article layer in the vertical direction (Z).

5. The method as claimed in claim 4, wherein, immediately before the compression of the article layer, the compressing apparatus and the set-down device are moved in the vertical direction (Z) relative to one another such that the at least one slider is located at the height of the article layer in the vertical direction (Z).

6. The method as claimed in claim 4, wherein, before the set-down device is moved to the second longitudinal position, the compressing apparatus and the set-down device are moved in the vertical direction (Z) relative to one another such that the set-down device is located beneath the compressing apparatus in the vertical direction (Z).

7. The method as claimed in claim 4, wherein the opening has a greater extent in the longitudinal direction (X) and in a transverse direction (Y) than the article layer.

* * * * *